United States Patent
Ho et al.

(10) Patent No.: US 10,126,827 B2
(45) Date of Patent: Nov. 13, 2018

(54) APPARATUS AND METHOD TO NAVIGATE MEDIA CONTENT USING REPETITIVE 3D GESTURES

(71) Applicants: Chi Fai Ho, Palo Alto, CA (US); Augustine Junda Ho, Palo Alto, CA (US)

(72) Inventors: Chi Fai Ho, Palo Alto, CA (US); Augustine Junda Ho, Palo Alto, CA (US)

( * ) Notice: Subject to any disclaimer, the term of this patent is extended or adjusted under 35 U.S.C. 154(b) by 46 days.

(21) Appl. No.: 15/234,070

(22) Filed: Aug. 11, 2016

(65) Prior Publication Data
US 2018/0046253 A1 Feb. 15, 2018

(51) Int. Cl.
*G06F 3/01* (2006.01)

(52) U.S. Cl.
CPC .................................... *G06F 3/017* (2013.01)

(58) Field of Classification Search
CPC .............................. G06F 3/017; G06F 3/005
See application file for complete search history.

(56) References Cited

U.S. PATENT DOCUMENTS

| | | | | |
|---|---|---|---|---|
| 2008/0134078 A1* | 6/2008 | Han | ................ | G06F 3/0485 715/784 |
| 2009/0228841 A1* | 9/2009 | Hildreth | ................ | G06F 3/0304 715/863 |
| 2010/0289743 A1* | 11/2010 | Sun | ................ | G06F 3/017 345/158 |
| 2011/0122081 A1* | 5/2011 | Kushler | ................ | G06F 3/0233 345/173 |
| 2013/0169786 A1* | 7/2013 | Yang | ................ | H04N 5/4403 348/77 |
| 2016/0378295 A1* | 12/2016 | Cousins | ................ | G06F 3/04812 715/702 |

* cited by examiner

*Primary Examiner* — Ryan A Lubit
(74) *Attorney, Agent, or Firm* — North Shore Patents, P.C.; Michele Liu Baillie

(57) ABSTRACT

In a method for detecting a repetitive three-dimensional gesture by a computing device, a three-dimensional gesture sensor detects a plurality of positions corresponding to a finger movement. The computing device determines whether the plurality of positions contain a gesture cycle by: comparing at least two non-adjacent positions in the plurality of positions; and upon determining that the at least two non-adjacent positions match, determining that the plurality of positions contain the gesture cycle. Upon determining that the plurality of positions contains the gesture cycle, the computing device creates a gesture cycle record for the gesture cycle, creates a repetitive gesture record for a repetitive gesture, and stores the gesture cycle record in the repetitive gesture record.

24 Claims, 7 Drawing Sheets

---

Gesture Cycle 334

Gesture Type
Speed or Duration
Range (x, y, z) and Span
Orientation
A plurality of positions
A location

---

Repetitive Gesture 332

Gesture type
Gesture Cycles Count
List of Gesture Cycles
Orientation/Direction
Location
Mode

Gesture Cycle 334

Gesture Type
Speed or Duration
Range (x, y, z) and Span
Orientation
A plurality of positions
A location

Repetitive Gesture 332

Gesture type
Gesture Cycles Count
List of Gesture Cycles
Orientation/Direction
Location
Mode

Fig. 4

Gesture-Content Action List 451

Video/Movies/TV
Small Circle – forward / rewind
Large Circle – skip chapter/episode
Swipe – skip chapter/episode Music/Audio
Small Circle – forward / rewind
Large Circle – skip track/playlist item
Swipe – skip track/playlist item E-Book/Document/Web Page/Email/e-Magazine
Small Circle – scroll / flip page / forward / rewind
Large Circle – skip section/heading/chapter/book
Swipe – flip page
Wide Swipe – flip section/chapter/article
Tap – zoom Photo Album/Gallery
Small Circle – scroll / flip page / photo
Large Circle – skip
Tap - zoom

Fig. 6

APPARATUS AND METHOD TO NAVIGATE MEDIA CONTENT USING REPETITIVE 3D GESTURES

BACKGROUND OF THE INVENTION

Field

This invention relates generally to media players, and more specifically, to navigating media content using repetitive 3-D gestures.

Related Art

Users have been fascinated with virtual reality and augmented reality technologies and products. These technologies and products allow users to see something users typically do not see. Virtual or augmented reality products typically include a device or gadget, covering one or both eyes of the user so that the gadget can present an image different from what the users would normally see. Some examples are binoculars, night vision goggles, high-power magnifying glasses which allow users to see afar, very small objects, blurry objects, or objects in the dark. Other examples, such as kaleidoscopes and slide film viewers, present a different world of images from where the viewer is. These gadgets do not anticipate that viewers will interact with the presented object. Most of the gadgets have buttons, wheels, sliders or other physical control for viewers to change a slide or to adjust a setting.

Since the advances of computer video games, many iterations of HMD (head-mounted display) devices, in a form of a headset or helmet, are introduced to allow a viewer, or gamer, to play games in an immersed virtual reality manner, i.e. without seeing the physical surrounding. The newer HMD devices are similar to previous gadgets in that garners are presented a vision different from reality in an enclosed or simulated manner. Earlier HMD headsets include Sega™ VR, and more recent HMD headsets include Oculus Rift™, HTC Vive™, Samsung Gear VR®, Microsoft™ HoloLens. These headsets require a gamer to interact with objects being displayed in order to play a game or to control the object. HoloLens uses a free hand gesture technology while the others use handheld controllers or touch pads. HoloLens allows a user to, from the user's point of view, act upon the object spatially with her hands. For example, to turn a knob, the user would hold her hand in a semi-closed manner around the knob, which is visible only through the HoloLens, and turns her hand.

However, if a user is watching a movie in such a HMD device and wants to fast forward the movie, the user may have to locate a fast forward button on the handheld controller, to move the cursor to the fast forward button using the touch pad, or to put the hand on the fast forward button on the display. The user may then have to press the fast forward button, perhaps a few times to continue fast forwarding, or to press a different button to stop fast forwarding. Since the user typically does not see her hand while wearing the HMD device, it would be a challenge for her to find the right button or to use the touch pad. In the case of HoloLens, the fast forward button would be a small object in her HoloLens visual view. It would also be a challenge for her to point correctly to the button, when there would be many other control buttons such as play, pause, rewind, and exit buttons competing for space in her HoloLens view.

In a different usage, while a user is reading an electronic document, an e-book or e-magazine, the user wants to skip a chapter or article. The user would flip multiple pages of the document. With a handheld controller the user is challenged, without seeing his fingers nor controller, to find the proper button or sequence of buttons to perform the flipping task. With a touch pad, the user is challenged to swipe in a proper direction on the touch pad multiple times, without seeing the touch pad nor his fingers.

In the above usage scenarios, it would be better if the device employs a better natural user interface (NUI) to recognize free hand or touchless 3D-gestures, particularly when such gestures are repeated to indicate a continuous action onto a media content.

The above scenarios illustrate the need to present a media content in conjunction with repetitive touchless 3D-gestures.

BRIEF SUMMARY OF THE INVENTION

Disclosed herein is a method for detecting a repetitive 3-D gesture and a corresponding system and a computer readable storage medium as specified in the independent claims. Embodiments of the present invention are given in the dependent claims. Embodiments of the present invention can be freely combined with each other if they are not mutually exclusive.

According to one embodiment of the present invention, in a method for detecting a repetitive three-dimensional gesture by a computing device, a three-dimensional gesture sensor detects a plurality of positions corresponding to a finger movement. The computing device determines whether the plurality of positions contain a gesture cycle by: comparing at least two non-adjacent positions in the plurality of positions; and upon determining that the at least two non-adjacent positions match, determining that the plurality of positions contain the gesture cycle. Upon determining that the plurality of positions contains the gesture cycle, the computing device creates a gesture cycle record for the gesture cycle, creates a repetitive gesture record for a repetitive gesture, and stores the gesture cycle record in the repetitive gesture record.

In one aspect of the present invention, the computing device further detect a second plurality of positions corresponding to the finger movement by the three-dimensional gesture sensor. The computing device determines whether the second plurality of positions contain a second gesture cycle by: comparing at least two non-adjacent positions in the second plurality of positions; and upon determining that the at least two non-adjacent positions match, determining that the second plurality of positions contain the second gesture cycle. Upon determining that the second plurality of positions contains the second gesture cycle, the computing device creates a second gesture cycle record for the second gesture cycle, compares the gesture cycle record and the second gesture cycle record, and upon determining that the second gesture cycle record matches the gesture cycle record, stores the second gesture cycle record in the repetitive gesture record.

In another aspect of the present invention, the gesture cycle record and the second gesture cycle record each includes one or more attributes of the gesture cycle or the second gesture cycle, and the one or more attributes of the gesture cycle or the second gesture cycle includes one or more of a group comprising: a gesture type of the gesture cycle or the second gesture cycle; a duration of the gesture cycle or the second gesture cycle; a span of the plurality of positions; an orientation of the plurality of positions; the plurality of positions; and a location of the gesture cycle or the second gesture cycle. The computing device compares one or more of the attributes in the gesture cycle record with one or more of the attributes in the second gesture cycle record, and upon determining that the one or more of the attributes in the gesture cycle record matches the one or more of the attributes in the second gesture cycle record, determines that the second gesture cycle record matches the gesture cycle record.

In another aspect of the present invention, the computing device sends the repetitive gesture record to a media player to apply the repetitive gesture to a presentation of a media content.

In another aspect of the present invention, the media player receives the repetitive gesture record from the computing device, where the repetitive gesture record includes a gesture type. The media player retrieves the gesture type from the repetitive gesture record, determines an action associated with the gesture type, and applies the action to the presentation of the media content.

In another aspect of the present invention, the repetitive gesture record includes one or more attributes of the repetitive gesture, where the one or more attributes of the repetitive gesture includes one or more of a group comprising: a gesture type of the repetitive gesture; an orientation of the repetitive gesture; and a list of gesture cycle records comprising the gesture cycle record and a second gesture cycle record for a second gesture cycle.

In another aspect of the present invention, the action applied to the presentation of the media content is based on a change of a speed or a duration of the finger movement between the gesture cycle and the second gesture cycle.

In another aspect of the present invention, the media player includes a gesture-content action list comprising a list of associations between media content types, gesture types, and actions. The media player determines a media type of the media content and determines the action associated with the gesture type and the media type according to the list of associations.

BRIEF DESCRIPTION OF THE SEVERAL VIEWS OF THE FIGURES

FIG. 4 illustrates an exemplary embodiment of repetitive gesture attributes.

FIG. 6 illustrates an exemplary embodiment to associate repetitive gestures to media content types.

DETAILED DESCRIPTION OF THE INVENTION

Figure 1:
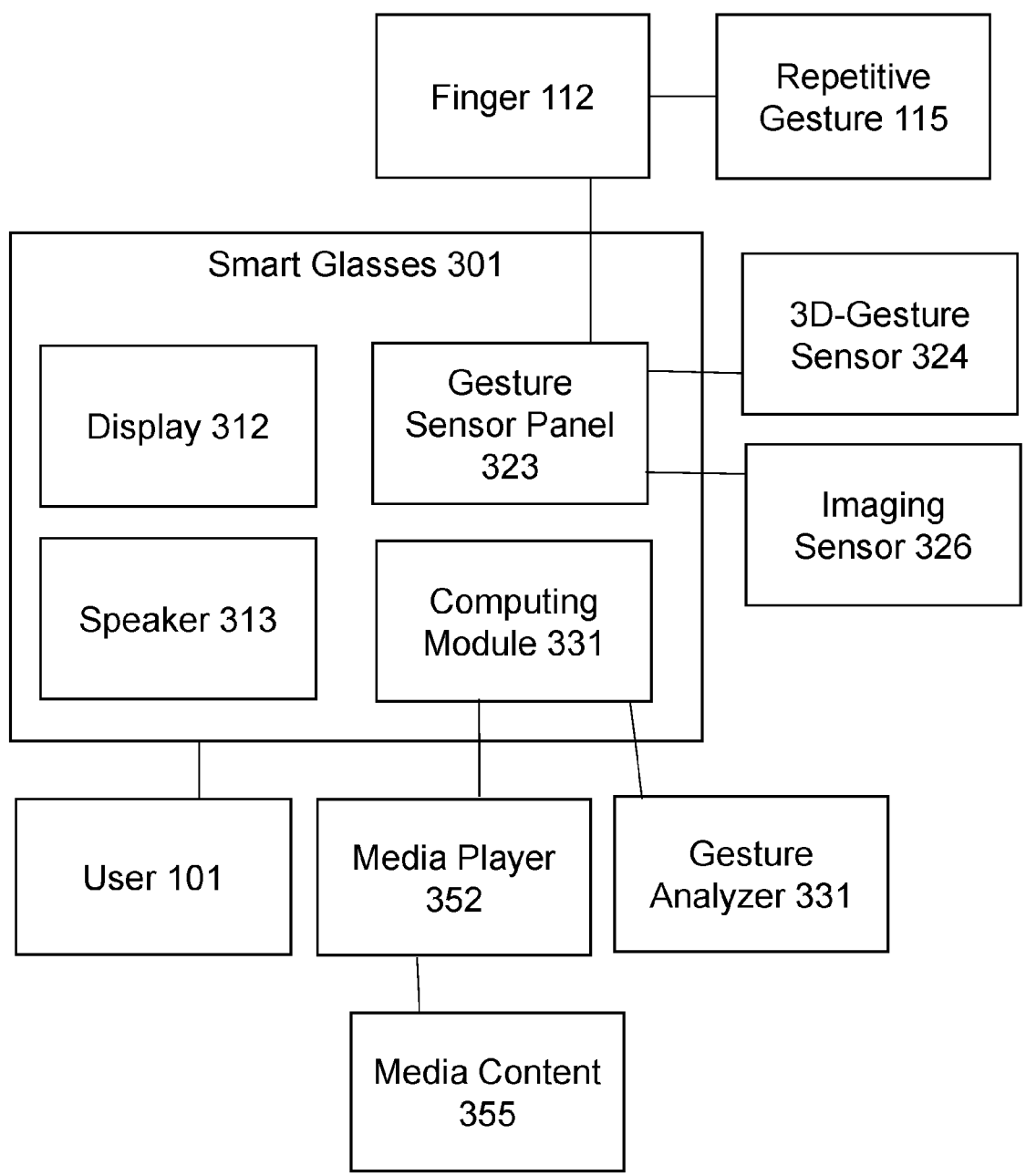
FIG. 1 illustrates an exemplary embodiment of a process to play a media content using a repetitive 3D-gesture.

FIG. 1 illustrates an exemplary embodiment of a process for a user to navigate presentation of a media content using a repetitive 3D-gesture. In one typical embodiment, user 101 uses smart glasses 301 to present media content 355. Media content 355 is presented to user 101 by a media player 352, which includes a plurality of computing instructions stored on a computer readable storage medium, being executed by computing module 331 included in smart glasses 301. Presentation of media content 355 may include presentation using a display 312 and/or a speaker 313 of smart glasses 301.

In one embodiment, user 101 uses her finger 112 to perform a repetitive 3D (three dimensional or spatial) gesture 115. User 101 may use one or more fingers when performing repetitive gesture 115. In a preferred embodiment, user 101 performs the gesture 115 near smart glasses 301, for example an inch or 4-8 inches away from smart glasses 301. In one embodiment, smart glasses 301 includes gesture sensor panel 323, which may include a 3D-gesture sensor 324 to detect movement of finger 112 and repetitive gesture 115. Gesture sensor panel 323 may include an imaging sensor 326 to detect the finger 112. Gesture sensor 324 includes a touchless sensor (not shown) that can detect the finger 112 without the finger 112 touching the gesture sensor panel 323 or smart glasses 301. In one embodiment, gesture sensor 324 includes an electrode, which generates electrical signals and detects electrical signal strength of a proximity area near gesture sensor panel 323. In one embodiment, the detected electrical signal strength is used to determine a spatial position of finger 112. In one embodiment, gesture sensor 324 includes a distance sensor (not shown) which generates a signal, such as sound signal, optical signal or infrared signal, and detects reflected signals to determine a spatial position of finger 112. In one embodiment, gesture sensor 324 includes imaging sensor 326. In one embodiment, gesture sensor panel 323 includes an imaging sensor 326 to be used in conjunction with gesture sensor 324 to determine a position of finger 112.

In one embodiment, gesture sensor panel 323 is mounted onto a frame of smart glasses 301. In one embodiment, gesture sensor 324, and optionally imaging sensor 326, are placed onto a frame of smart glasses 301.

In one embodiment, as user 101 is moving finger 112 to perform repetitive gesture 115, gesture sensor panel 323 detects and captures a plurality of spatial positions of finger 112 corresponding to repetitive gesture 115.

In one embodiment, after capturing repetitive gesture 115 in a form of a plurality of spatial positions of finger 112, gesture sensor panel 323 passes captured repetitive gesture 115 to gesture analyzer 331 for processing. Gesture analyzer 331 sends analyzed repetitive gesture 115 to media player 352. In one embodiment, media player 352 receives analyzed repetitive gesture 115 and determines the action to be applied to the presentation of media content 355 based on the repetitive gesture 115. For example, repetitive gesture 115 indicates a repetitive clockwise circular motion perpendicular and outward from smart glasses 301. In one embodiment, media player 352 determines that the action to be applied is to fast forward the playing of a video of media content 355. In one embodiment, media player 352 fast forwards the playing of media content 355 faster and faster in response to repetitive gesture 115 indicating a plurality of circular motions performed in a faster and faster manner. In one embodiment, media content 355 includes a map, and repetitive gesture 115 includes a plurality of repetitive tapping motions with an initial direction of pushing outward away from the smart glasses 301. Media player 352 applies a continuously zooming out of the display of the map in media content 355 based on the repetitive gesture 115, with a zooming speed relative and corresponding to the speed of repetitive tapping motions. In one embodiment, repetitive gesture 115 includes a plurality of tapping motions with an initial direction of pulling inward towards the smart glasses

301. Media player 352 applies a zooming in the display of the map in media content 355 accordingly.

In one embodiment, media player 352 examines media content 355 to determine an appropriate action to apply repetitive gesture 115 to presenting media content 355. In one embodiment, media player 352 applies different actions based on repetitive gesture 115 for different types of media content 355. In one embodiment, media player 352 selects the action to apply to media content 355 based on different attributes of repetitive gesture 115, such as orientation, direction, position, or motion type.

In one embodiment, media player 352 stops applying repetitive gesture 115 when finger 112 stops performing repetitive gesture 115. In one embodiment, media player 352 continues applying repetitive gesture 115 even after finger 112 stops performing repetitive gesture 115. Media player 352 receives another gesture, either a non-repetitive gesture or another repetitive gesture from gesture analyzer 331, and media player 352 responds by stopping the application of repetitive gesture 115.

Figure 2:
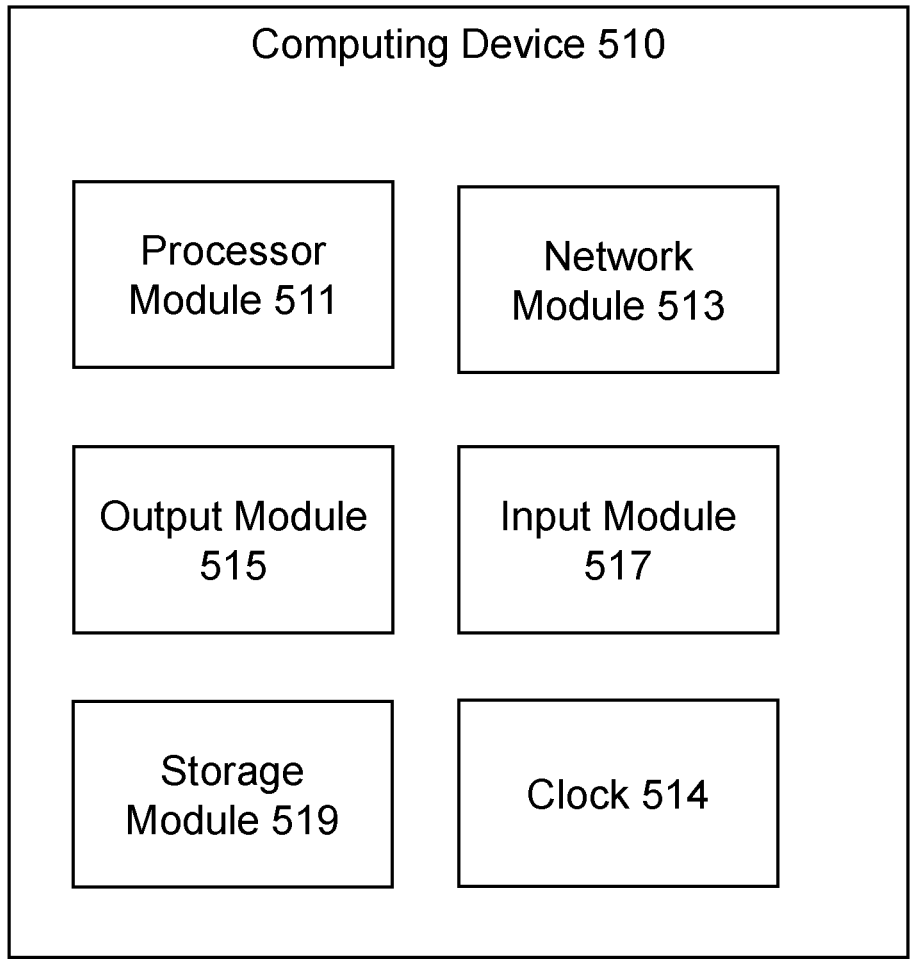
FIG. 2 illustrates an embodiment of a media player computing device.

FIG. 2 illustrates an exemplary embodiment of hardware components of a computing device which can be used for smart glasses. In one embodiment, computing device 510 includes a processor module 511, an output module 515, an input module 517, a storage module 519 and a clock 514. In one embodiment, computing device 510 also includes a network module 513. In one embodiment, processor module 511 includes one or more general processors, a multi-core processor, an application specific integrated circuit based processor, a system on a chip (SOC) processor or an embedded processor. In one embodiment, output module 515 includes a display for displaying video signals, images and text, and an audio speaker to play sound signals. In one embodiment, output module 515 includes a data interface such as USB, HDMI, DVI, DisplayPort, thunderbolt connecting to a display or a speaker. In one embodiment, input module 517 includes a physical or logical keyboard, buttons, keys, or microphones. In one embodiment, input module 517 includes or connects to one or more sensors such as an optical sensor, an infrared (IR) sensor, a camera sensor, a motion sensor, a direction sensor, a proximity sensor, a gesture sensor, or other sensors that is usable by a user to provide input to computing device 510. In one embodiment, input module 517 includes a physical panel housing one or more sensors. In one embodiment, storage module 519 includes a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, a NFC network, a personal area network (PAN), a WiFi network, or a LiFi network. Storage module 519 includes executable instructions which when executed by the processor module 511 of computing device 510, implement one or more functionalities of the present invention.

In one embodiment, computer device 510 includes a clock 514, which provides date and time information to computing device 510.

In one embodiment, computing device 510 does not include all of the modules. In one embodiment, computing device 510 does not have network module 513 or clock 514.

Returning to FIG. 1, smart glasses 301 includes a computing device housed in a glasses-like wearable frame. In one embodiment, smart glasses 301, together with the included computing device, is a clip-on to a glass frame. In one embodiment, smart glasses 301 is worn similar to a normal pair of glasses. In one embodiment, smart glasses 301 is a head-mounted device such as a helmet or a pair of goggles with head mounted trip. In one embodiment, user 101 wears smart glasses 301 in order to use smart glasses 301.

In one embodiment, gesture sensor panel 323 includes a circuit board mounted onto smart glasses 301, or onto a frame of smart glasses 301. In one embodiment, display 312 is a head mounted display of smart glasses 301. In one embodiment, display 312 has a size dimension similar to size of lenses of a pair of normal glasses. In one embodiment, display 312 includes one or two display panels, facing towards the eyes of user 101 so that user 101 can see display 312. In one embodiment, gesture sensor panel 323 is mounted behind display 312, facing outward from smart glasses 301, so that gesture sensor panel 323 can detect finger 112. In one embodiment, 3D gesture sensor 324 includes one or more electrodes placed onto gesture sensor panel 323. In one embodiment, imaging sensor 326 is mounted onto gesture sensor panel 323, e.g. near the center of sensor panel 323 and at about eye level of user 101, so that imaging sensor 326 can take an image of what user 101 could be seeing. In one embodiment, speaker 313 includes a headphone, an earphone, or a bone-conducting speaker that is worn by user 101 or attached onto smart glasses 301.

In one embodiment, media content 355 includes a video, a movie, a television show, a television series, an animation, a music video, a video playlist, a video presentation, a live tele-cast, a live feed, a streaming video, a live-streaming video, a feed obtained from a remote camera via a data network, or a live feed streaming from imaging sensor 326 or a camera attached to smart glasses 301. In one embodiment, media content 355 includes a song, a piece of music, an audio file, a streaming audio, an audio book, a playlist of audio content, a podcast, broadcast radio, or a live feed of audio streaming obtained from a data network or from a microphone attached to smart glasses 301. In one embodiment, media content 355 includes one or more pictures or images, a photo album, a gallery of images, or one or more animated pictures. In one embodiment, media content 355 includes a document, a web page, one or more messages or email messages, a list of documents or messages, an e-book, an electronic magazine or e-magazine, a web page, a note, or a list of notes. In one embodiment, media content 355 includes one or more of above combination of media content.

In one embodiment, media player 352 includes a plurality of computer programming instructions, which when executed, presents media content 355 over display 312 and/or speaker 313. Media player 352 may include an e-book reader, a web browser, a web-view software, an email client, an email app, a social media messaging application, a music player, a podcast player, a video player, an application for YouTube®, Netflix®, Hulu®, Amazon Instant Video®, or other online video services, a comic book electronic reader or application, an application aggregating news and magazine articles, a notes application, a calendar application, an address book or contact application, or other applications handling media content 355.

Figure 3:
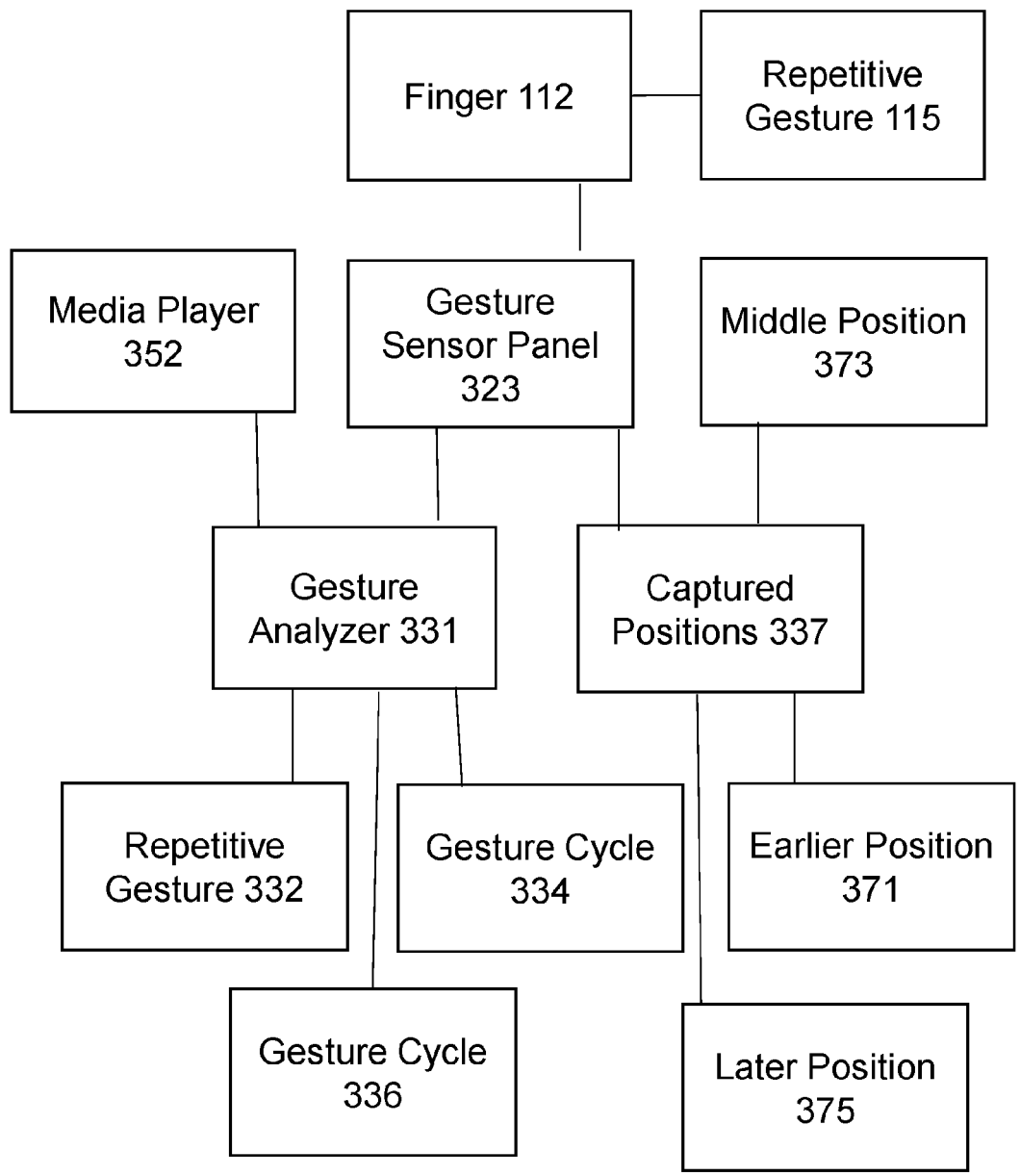
FIG. 3 illustrates an exemplary embodiment to capture a repetitive 3D gesture.

FIG. 3 illustrates an exemplary embodiment to capture a repetitive 3D-gesture. In one embodiment, finger 112 moves to form repetitive gesture 115. Gesture sensor panel 323 detects movement of the finger 112 and generates a plurality of capture positions 337 corresponding to the finger's 112 movement in the repetitive gesture 115. Gesture sensor panel 323 sends captured positions 337 to gesture analyzer 331. In one embodiment, gesture sensor panel 323 continuously detects finger 112 movement, captures addition positions, and includes the additional captured positions in captured positions 337. In one embodiment, gesture sensor panel 323 makes available the captured positions 337 to gesture analyzer 331 when additional positions are captured. In one embodiment, gesture analyzer 331 requests the captured positions 337 from the gesture sensor panel 323. Gesture analyzer 331 may send the request from time to time, periodically, or whenever it expects to receive the captured positions 337.

Gesture analyzer 331 examines captured positions 337 and determines if captured positions 337 contains a gesture cycle 334, as described further below. In one embodiment, captured positions 337 includes a list of a plurality of detected spatial positions of finger 112, listed in the order that the positions are captured by gesture sensor panel 323. In one embodiment, captured positions 337 include a 3-dimensional coordinate position of the finger 112, indicating three coordinate values such as x-value, y-value, and z-value.

In one embodiment, gesture analyzer 331 examines captured positions 337 and determines that there is a gesture cycle when a later position 375 in captured positions 337 matches an earlier position 371 in captured positions 337. The two matching positions are not adjacent in the captured positions 337. For example, the earlier position 371 is in a $5^{th}$ position in the captured positions 337, while the later position 375 is in the $20^{th}$ position in the captured positions 337. When the later position 375 matches the earlier position 371, the gesture analyzer 331 determines that the positions from the $5^{th}$ position to the $20^{th}$ position contain a gesture cycle. As illustrated in this example, the two matching positions are 14 positions apart. In one embodiment, gesture analyzer 331 first determines that a middle position does not match the earlier position 371, and then matches the later position 375 to the earlier position 371. When the later and earlier positions 371, 375 are matched, gesture analyzer 331 determines that a gesture cycle has been detected. In one embodiment, gesture analyzer 331 creates a gesture cycle 334 record to store the detected gesture cycle. In one embodiment, gesture cycle 334 stores a plurality of positions between earlier position 371 and later position 375, which includes middle position 373. In one embodiment, gesture cycle 334 stores only non-matching positions, i.e., no repeat positions, except possibly later position 375.

In one embodiment, upon detecting gesture cycle 334, gesture analyzer 331 creates a repetitive gesture 332 record, and stores gesture cycle 334 into repetitive gesture 332. In one embodiment, gesture analyzer 331 continues processing captured positions 337 to detect a second gesture cycle 336, after detecting gesture cycle 334 in the same manner described above. Gesture analyzer 331 then matches gesture cycle 336 to gesture cycle 334 of repetitive gesture 332. When gesture cycle 336 matches gesture cycle 334, gesture analyzer 331 determines gesture cycle 336 is a repeat cycle for repetitive gesture 332, and stores gesture cycle 336 into repetitive gesture 332.

In one embodiment gesture analyzer 331 reports repetitive gesture 332 to media player 352. In one embodiment, gesture analyzer 331 sends repetitive gesture 332 to media player 352 after detecting gesture cycle 334. In one embodiment, gesture analyzer 331 sends repetitive gesture 332 to media player 352 after detecting at least two gesture cycles, such as gesture cycle 334 and gesture cycle 336, in repetitive gesture 332. Gesture analyzer 331 continuously examines captured positions 337 to detect any further additional gesture cycles and matches detected additional gesture cycles to repetitive gesture 332. Upon determining that the additional gesture cycles match repetitive gesture 332, gesture analyzer 331 modifies repetitive gesture 332 to store the additional gesture cycles, and reports the modified repetitive gesture 332 with the additional gesture cycles to media player 352.

In one embodiment, gesture analyzer 331 matches earlier position 371 and later position 375 by matching their corresponding x-, y-, z-coordinate values. In one embodiment, in order to determine if the gesture cycle is an X-cycle, gesture analyzer 331 does not consider the x-values of either position. Gesture analyzer 331 compares the y-value and z-value pair of later position 375 to the y-value and z-value pair of earlier position 371 to determine if the positions are close. For example, the y-value range is 0-65535 and the z-value range is or 0-32767. Two positions are considered close to each other if the y-values of the two positions are within 100 units apart and the z-values are within 75 units apart, or the y-values are within 1000 units and z-values are within 1000 units. In one embodiment, the y-, z-coordinate range is divided into 5×5 cells. Two positions are close to each other when the two positions are in the same cell. In one embodiment, two positions are close to each other if they are within a pre-determined distance. Other embodiments for the y-value and z-value ranges may be (0-1023, 0-511), (1-1280, 1-800), (0-65535, 0-65535) or other ranges.

In one embodiment, gesture analyzer 331 matches earlier position 371 and later position 375 for detecting a Y-cycle by matching the x- and z-values of the two positions. In one embodiment, gesture analyzer 331 matches the two positions for detecting a Z-cycle by comparing the x- and y-values of the two positions. In one embodiment, gesture analyzer 331 matches the two position for detecting one or more of X-cycles, Y-cycles or Z-cycles simultaneously.

In one embodiment, gesture analyzer 331 divides an x-value range into two regions of space, defined as LEFT and RIGHT, and matches earlier position 371 and later position 375 for detecting a LEFT X-cycle, when both positions are within the LEFT region or a RIGHT X-cycle when both positions are in the RIGHT region. In one embodiment, gesture analyzer 331 may divide x-value range into three regions of space, defined as LEFT, CENTER and RIGHT. Gesture analyzer 331 detects a LEFT X-cycle, CENTER X-cycle or RIGHT X-cycle. Similarly, gesture analyzer 331 may divide y-value range into a plurality of regions of space, defined as UP, CENTER, DOWN, or divide z-value range into a plurality of regions of space, defined as IN, CENTER, OUT. Gesture analyzer 331 may detect a corresponding Y-cycle or Z-cycle within a y-value region or a z-value region.

In one embodiment, gesture analyzer 331 detects two different cycles by matching earlier position 371 and later position 375, such as an X-cycle and a Z-cycle. In this embodiment, finger 112 may perform repetitive gesture 115 in a slanted or diagonal direction. In one embodiment, gesture analyzer 331 stores both detected cycles into gesture cycle 334. In one embodiment, gesture analyzer 331 determines, using other information, to record only one cycle, such as Z-cycle, into gesture cycle 334. In one embodiment, gesture analyzer 331 discards X-cycle after detecting gesture cycle 336, which may be a Z-cycle, thus indicating gesture cycle 334 is a Z-cycle.

In one embodiment, gesture analyzer 331 collects additional information into gesture cycle 334, as illustrated in FIG. 4. Gesture cycle 334 may include one or more attributes, including but not limited to a gesture type; a speed or duration; a range or span of x-, y-, z-values; an orientation; a plurality of positions; and a location. The gesture cycle 334 is stored in a list of gesture cycles in the repetitive gesture 332. As shown in FIG. 4, repetitive gesture 332 may include one or more attributes, including but not limited to: gesture type; gesture cycle count; list of gesture cycles; orientation or direction; and location. Returning to FIG. 3, in one embodiment, gesture sensor panel 323 stores in captured positions 337 an indication of the time at which a position is captured. Gesture analyzer 331 calculates a cycle duration or speed of gesture cycle 334 using the time indications or timestamps between earlier position 371 and later position 375. In one embodiment, gesture analyzer 331 calculates the maximum span of x-values, y-values and z-values of all positions in gesture cycle 334. In one embodiment, gesture analyzer 331 calculates the directions of changes from one position to the next position in gesture cycle 334. For example, gesture cycle 334 includes a Y-cycle, and the directions of changes x-value and z-value are (+, +), (+,+), (+,+), (+,−), (+,−), (−, −), (−, −), (−,+), and (−,+), where "+" includes an increase in value and "−" indicates a decrease in value. Gesture analyzer 331 determines this as a clockwise orientation. An example of counter-clockwise orientation includes the directions of changes being (+,−), (+,−), (+,+), (+,+), (−,+), (−,−), and (−,−). In one embodiment, gesture cycle 334 includes an X-cycle and gesture analyzer 331 determines an orientation of gesture cycle 334 by calculating the directions of changes of y- and z-values from one position to the next position, and matching the directions of changes to a pre-determine rule regarding orientation. Similarly gesture analyzer 331 calculates an orientation of a Z-cycle if gesture cycle 334 includes a Z-cycle.

In one embodiment, gesture cycle 334 includes a Z-cycle and the directions of changes of x-value and y-value are (+,+), (+,+), (−,−), and (−,−). Gesture analyzer 331 calculates the Z-cycle orientation or direction of gesture cycle 334 is LEFT-to-RIGHT. Other possible orientations or directions include RIGHT-to-LEFT, IN-to-OUT, UP-to-DOWN, DOWN-to-IN, OUT-to-IN, DIAGONAL, UP-RIGHT-to-DOWN-LEFT, UP-LEFT-to-DOWN-RIGHT, and other similar orientations. In one embodiment, gesture cycle 334 includes an orientation, such as clockwise, and a direction, such as DIAGONAL.

In one embodiment, gesture analyzer 331 determines a gesture type for gesture cycle 334. In one embodiment, gesture analyzer 331 determines the gesture type based on the span of gesture cycle 334. In one embodiment, gesture cycle 334 includes an X-cycle and the y-span is about the same as the z-span, or the ratio of y-span to z-span is between 0.75 and 1.25. Gesture analyzer 331 then determines that the gesture type is a circle. In one embodiment, gesture cycle 334 includes an X-cycle, and the y-span is zero or small but the z-span is large. Gesture analyzer 331 then determines that the gesture type is a swipe. In one embodiment, the y-span is small and the z-span is medium. Gesture analyzer 331 determines the gesture type is a tap. In one embodiment, the ratio between the y-span and z-span is between ¼ and ½, and gesture analyzer 331 determines the gesture type is an ellipse. In one embodiment, gesture analyzer 331 determines a gesture type for gesture cycle 334 when gesture cycle 334 includes a Y-cycle or a Z-cycle. In one embodiment, gesture analyzer 332 determines a gesture type to be an ellipse, a circle, a tap, or a swipe when gesture cycle 334 includes a Y-cycle or a Z-cycle. In one embodiment, gesture analyzer 331 processes gesture cycle 334 to determine other gesture types such as a knock, a push or pull.

In one embodiment, gesture analyzer 331 calculates a location of gesture cycle 334. In one embodiment, the location of gesture cycle 334 is calculated based on the first position of gesture cycle 334. In one embodiment, the location of gesture cycle 334 is calculated as a center position of gesture cycle 334, based on the plurality of positions of gesture cycle 334. In one embodiment, the location of gesture cycle 334 is calculated based on a position according to the mean x-value, y-value, and z-value of the plurality of positions of gesture cycle 334. In one embodiment, gesture analyzer 331 sets location of gesture cycle 334 as location of repetitive gesture 332.

In one embodiment, gesture analyzer 331 detects gesture cycle 336 and determines additional attributes for gesture cycle 336, such as a gesture type, speed or duration, a range and span, orientation, a plurality of positions, and a location.

In one embodiment, gesture analyzer 331 matches gesture cycle 334 and gesture cycle 336 by matching one or more attributes of the two gesture cycles. In one embodiment, the gesture types or the two orientations of the two gesture cycles do not match, and gesture analyzer 331 determines that the two gesture cycles do not match. In one embodiment, the spans of the two gesture cycles differ beyond a predetermined threshold, and gesture analyzer 331 determines that the two gesture cycles do not match. In one embodiment, the gesture types, the orientations, the spans, and optionally the locations of the two gesture cycles match, gesture analyzer 331 concludes that the two gesture cycles match.

In one embodiment, upon concluding gesture cycle 336 matches gesture cycle 334, gesture analyzer 331 adds gesture cycle 336 to the list of gesture cycles in repetitive gesture 332. In one embodiment, gesture analyzer 331 store gesture type and orientation of gesture cycle 334 as gesture type and orientation of repetitive gesture 332. In one embodiment, gesture analyzer 331 maintains a gesture cycle count for the number of gesture cycles in the list of gesture cycles and increments the count for repetitive gesture 332. In one embodiment, gesture analyzer 331 updates location of repetitive gesture 332 based on location of gesture cycle 336. In one embodiment, gesture analyzer 331 determines that the location of the repetitive gesture 332 is to be a center location between location of gesture cycle 334 and location of gesture cycle 336, or more generally, a center location among locations of the list of gesture cycles in repetitive gesture 332. In one embodiment, gesture analyzer 331 does not update location of repetitive gesture 332 and instead uses location of first gesture cycle in the list of gesture cycles as the location of repetitive gesture 332.

In one embodiment, when gesture analyzer 331 determines gesture cycle 336 does not match gesture cycle 334, gesture analyzer 331 indicates repetitive gesture 332 is completed by sending a notification to media player 352. In one embodiment, gesture analyzer 331 creates a new repetitive gesture based on gesture cycle 336. In one embodiment, repetitive gesture 332 includes a mode attribute indicating gesture analyzer 331 is continuing to detect a next gesture cycle of repetitive gesture 332. In one embodiment, gesture analyzer 331 sets the mode attribute to "DETECTING", "0" or "NON-FINAL" when storing gesture cycle 334 into repetitive gesture 332. Upon determining gesture cycle 336 does not match gesture cycle 334, gesture analyzer 331 indicates repetitive gesture 332 is completed by setting the mode attribute to "FINAL", "1" or "NON-DETECTING".

Figure 5:
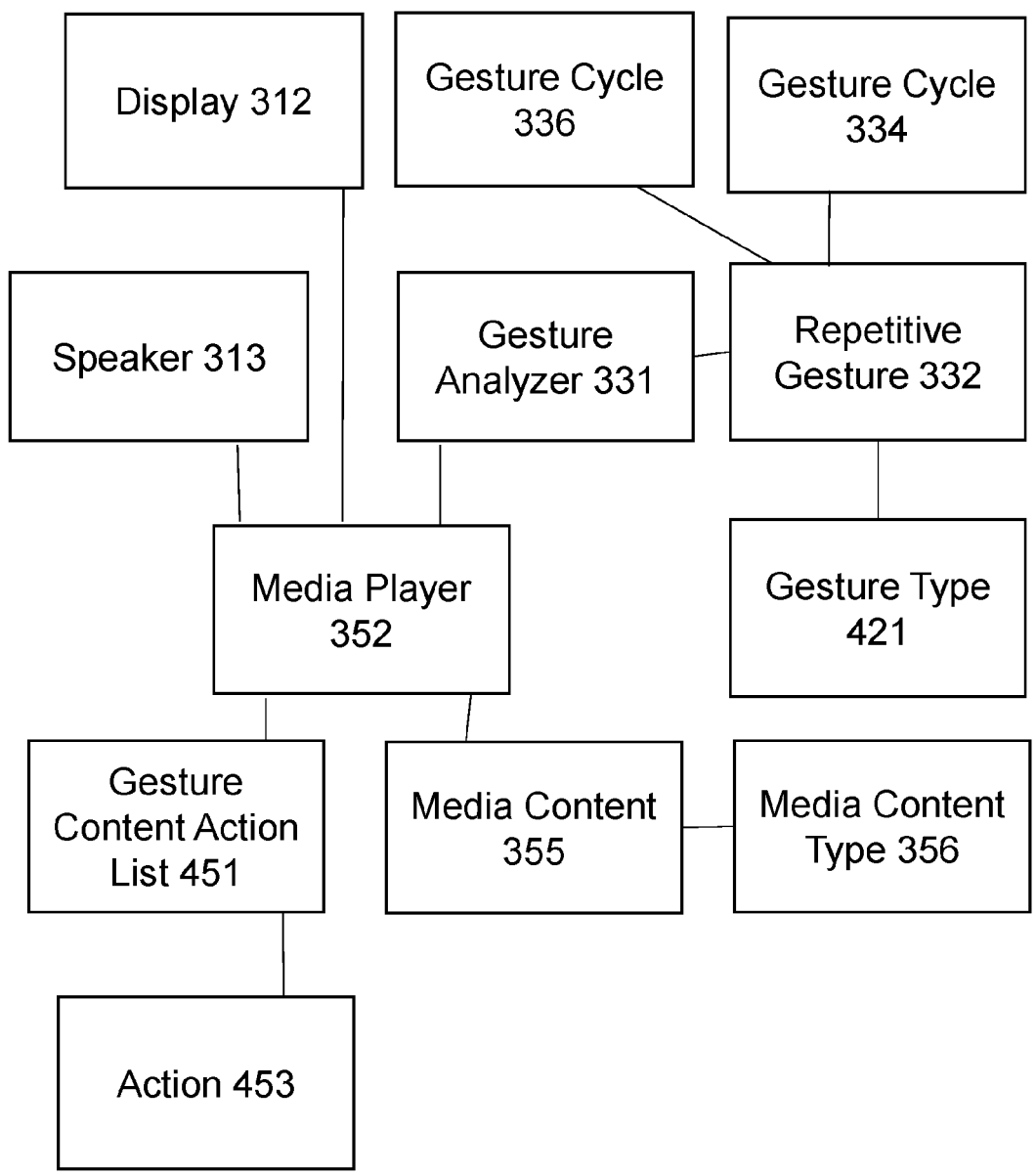
FIG. 5 illustrates an exemplary embodiment to process an input repetitive gesture when playing a media content.

FIG. 5 illustrates an exemplary embodiment to process a repetitive gesture while playing a media content. Media player 352 is presenting media content 355 onto display 312 or speaker 313. In one embodiment, gesture analyzer 331 detects repetitive gesture 332. Repetitive gesture 332 includes gesture cycle 334. In one embodiment, gesture analyzer 331 sends repetitive gesture 332 to media player 352. In one embodiment, media player 352 requests and receives repetitive gesture 332 from gesture analyzer 331.

In one embodiment, media player 352 processes repetitive gesture 332 and changes the presentation of media content 352 according to the gesture cycles in the list of gesture cycles. Media player 352 retrieves gesture type 421 of repetitive gesture 332 and determines an action 453 associated with the gesture type 421 to apply to media content 355. In one embodiment, media player 352 determines media content type 356 of media content 355. Media player 352 may retrieve media content type 356 as an attribute of media content 355, or determines media content type 356 based on a receiving mechanism of media content 355, such as a data network protocol, a file name extension, a capturing mechanism using a camera or microphone or other mechanism. In one embodiment, media player 352 includes a gesture-content action list 451 and selects action 453 from gesture-content action list 451 associated with gesture type 421 and media content type 356. FIG. 6 illustrates an embodiment of gesture-content action list 451. For example, a small circle gesture for a video media content is associated with an action of forwarding or rewinding; a swipe gesture for a video is associated with a skip of a chapter or episode; a large circle gesture for audio media content is associated with a skip of a track or a playlist item; a tap gesture for an e-magazine content is associated with a zoom in or zoom out. In one embodiment, media player 352 uses other attributes in repetitive gesture 332, such as a span of gesture cycle 334, to determine if repetitive gesture 332 is a small circle or a wide swipe gesture, in order to select an action. In one embodiment, media player 352 matches media content type 356, gesture type 421 and optionally other attributes in repetitive gesture 332 to select an action 453.

In one embodiment, media player 453 applies action 453 to the presentation of media content 355, using other attributes of repetitive gesture 332. In one embodiment, action 453 is to forward or to rewind a video of media content 355. Media player 352 retrieves orientation of repetitive gesture 332. In one embodiment, the orientation of repetitive gesture 332 is clockwise, and media player 352 fast forwards the display of the video of media content 355. In one embodiment, the orientation is counter-clockwise, and media player 352 rewinds the display of the video of media content 355. In one embodiment, media player 352 examines the duration of gesture cycle 334 of repetitive gesture 332 and determines the speed of the forwarding or rewinding action.

In one embodiment, action 453 is to scroll a list in media content 355. Media player 352 determines the direction of scrolling action using the orientation of repetitive gesture 332, and the speed of scrolling action using the duration of gesture cycle 334.

Other actions for action 453 may require different decision made by media player 352 based on orientation of repetitive gesture 332. In one embodiment, media player 352 applies action 453 according to orientation of repetitive gesture 332 and a factor based on a user preference or a content type. In one embodiment, a user preference indicates a left hand motion. Media player 352 rewinds the display of the video of media content 355 when the orientation is clockwise and forwards the display of the video when the orientation is counter-clockwise. In one embodiment, media content 355 includes a document in a right-to-left language. Media player 352 applies action 453 to flip the document forward when the orientation of repetitive gesture 332 is from left to right.

In one embodiment, gesture analyzer 331 detects a second gesture cycle 336 for repetitive gesture 332. In one embodiment, media player 352 receives gesture cycle 336 of repetitive gesture 332 while applying action 453. Media player 352 includes gesture cycle 336 attributes in further applying action 453. In one embodiment, action 453 is to fast forward video content in media content 355. Media player 352 retrieves duration of gesture cycle 336 and determines the duration is shorter than gesture cycle 334, meaning gesture cycle 336 is performed faster than gesture cycle 334. Media player 352 applies a faster speed in forwarding the video content. For example, media player 352 applies 2 times as fast or 1.5 times as fast as current speed. In one embodiment, the duration of gesture cycle 336 is longer than the duration of gesture cycle 334, and media player 352 slows the speed of forwarding, for example half the current speed or 75% of the current speed. In one embodiment, media player 352 changes the speed of action 453 when there is a change of span of gesture cycle 336 from the span of gesture cycle 334.

In one embodiment, gesture analyzer 331 detects an end of the list of gesture cycles in repetitive gesture 332 and sends a notification to media player 352. In one embodiment, media player 352 responds to the notification by stopping the application of action 453. In one embodiment, gesture analyzer 331 does not immediately stop applying action 453, but instead slows the speed of action 453 to provide a smooth presentation of media content 355 to avoid a sudden stop of the action 453.

In one embodiment, media player 352 includes a pre-configured gesture-content action list 451. In one embodiment, media player 352 obtains gesture-content action list 451 from a storage module, media content 355, or from a source providing media content 355. In one embodiment, media player 352 obtains gesture-content action list 451 from a user of media player 352. In one embodiment, gesture-content action list 451 is pre-configured according to a user preference. For example, the action associated with a repetitive gesture may differ between a right-handed user and a left-handed user, between users of different cultures, or for users with physical impairments.

In one embodiment, media content 355 includes action 453, which may be a computer programming instruction or a computer scripting instruction embedded in media content 355. For example, media content 355 may include a JavaScript, a Java object, a visual basic script, or embedded computer instructions. Media player 352 retrieves action 453 from media content 355 and applies action 453.

Figure 7:
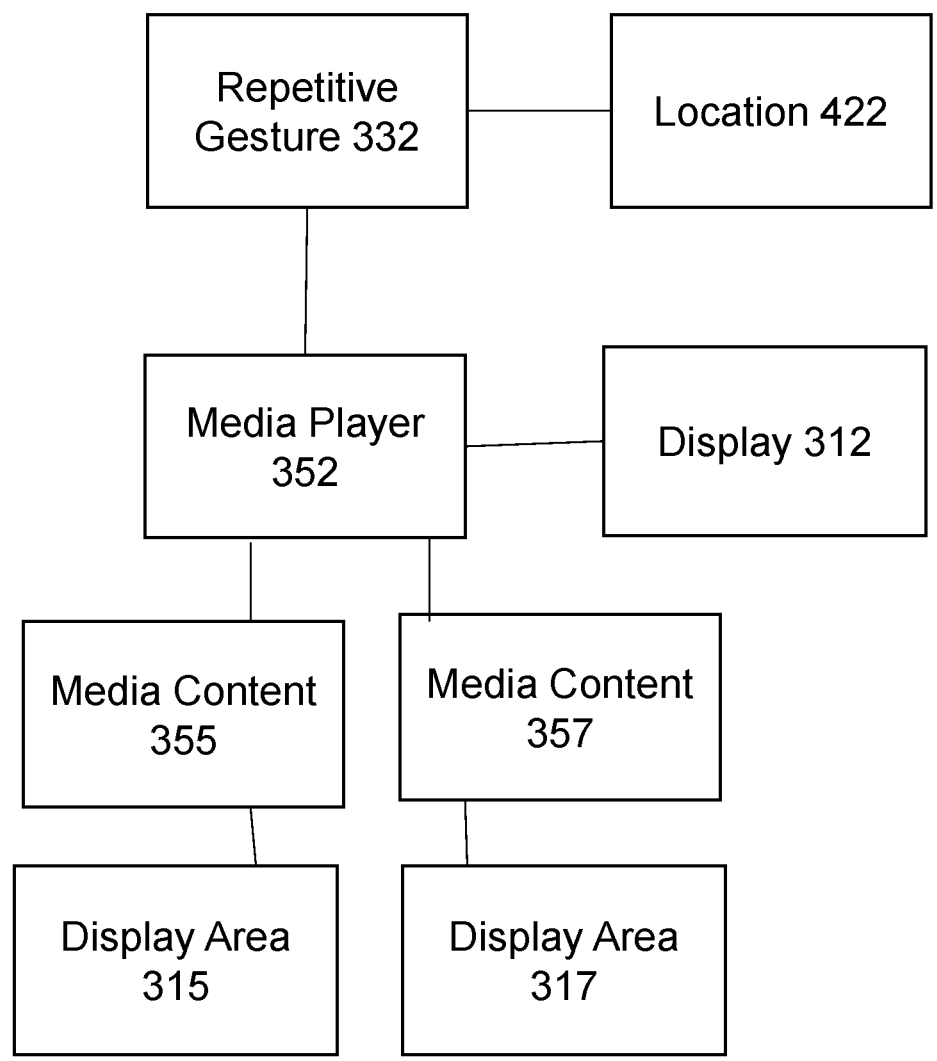
FIG. 7 illustrates an exemplary embodiment to process an input repetitive gesture when playing a plurality of media content.

In one embodiment, media player 352 is presenting a plurality of media content such as media content 355 and media content 357 as illustrated in FIG. 7. In one embodiment, media content 355 is presented on a display area 315 of display 312, and media content 357 is presented on a display area 317 of display 312. In one embodiment, media player 352 receives repetitive gesture 332 and selects a media content to apply repetitive gesture 332. In one embodiment, media content 355 is marked active and media player 352 selects media content 355 for processing repetitive gesture 332. In one embodiment, media player 352 retrieves location 422 of repetitive gesture 332 and matches location 422 to display area 315 and displayer area 317. In one embodiment, location 422 is inside display area 317, and media player 352 selects media content 357 to process repetitive gesture 332. In one embodiment, location 422 indicates a right side, and display area 317 is on the right side of display 312. Media player thus 352 selects media content 357. In one embodiment, location 422 indicates an outer region or a large z-value, and display area 317 is smaller than display area 315. Media player 352 thus selects media content 357. In one embodiment, location 422 indicates an inner region or a small z-value, and display area 315 is larger than display area 317. Media player 352 selects media content 355.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting a repetitive three-dimensional gesture by a computing device, comprising:
   (a) detecting a plurality of positions corresponding to a finger movement by a three-dimensional gesture sensor, each of the plurality of positions comprising three-dimensional coordinates for a corresponding position;
   (b) determining, by the computing device, whether the plurality of positions contain a first gesture cycle, comprising:
      (b1) comparing the three-dimensional coordinates for a first at least two non-adjacent positions in the plurality of positions;
      (b2) upon determining that the three-dimensional coordinates for the first at least two non-adjacent positions match, determining that the plurality of positions contain the first gesture cycle;
   (c) upon determining that the plurality of positions contains the first gesture cycle:
      (c1) creating a first gesture cycle record for the first gesture cycle, comprising:
         (c1i) calculating a first span of the three-dimensional coordinates for the first at least two non-adjacent positions;
         (c1ii) determining a first gesture type of the first gesture cycle based on the first span; and
         (c1iii) storing the first span and the first gesture type in the one or more attributes of the first gesture cycle in the first gesture cycle record;
      (c2) creating a repetitive gesture record for a repetitive gesture; and
      (c3) storing the first gesture cycle record in the repetitive gesture record;
   (d) determining, by the computing device, whether the plurality of positions contain a second gesture cycle, comprising:
      (d1) comparing the three-dimensional coordinates for a second at least two non-adjacent positions in the plurality of positions;
      (d2) upon determining that the three-dimensional coordinates for the second at least two non-adjacent positions in the plurality of positions match, determining that the plurality of positions contain the second gesture cycle; and
      (d3) creating a second gesture cycle record for the second gesture cycle, comprising:
         (d3i) calculating a second span of the three-dimensional coordinates for the second at least two non-adjacent positions;
         (d3ii) determining a second gesture type of the second gesture cycle based on the second span; and
         (d3iii) storing the second span and the second gesture type in the one or more attributes of the second gesture cycle in the second gesture cycle record;
   (e) determining, by the computing device, whether the second gesture cycle matches the first gesture cycle, comprising:

(e1) comparing, by the computing device, one or more attributes of the first gesture cycle in the first gesture cycle record and one or more attributes of the second gesture cycle in the second gesture cycle record; and (f) upon determining that the second gesture cycle matches the first gesture cycle, storing the second gesture cycle record in the repetitive gesture cycle.

2. The method of claim 1, further comprising:

(g) sending the repetitive gesture record to a media player to apply the repetitive gesture to a presentation of a media content.

3. The method of claim 2, further comprising:

(h) receiving the repetitive gesture record from the computing device by the media player, the repetitive gesture record comprising a gesture type of the repetitive gesture;

(i) retrieving the gesture type of the repetitive gesture from the repetitive gesture record by the media player;

(j) determining an action associated with the gesture type of the repetitive gesture by the media player; and (k) applying the action to the presentation of the media content.

4. The method of claim 3, wherein the repetitive gesture record comprises one or more attributes of the repetitive gesture, the one or more attributes of the repetitive gesture comprising the gesture type of the repetitive gesture and one or more of a group comprising: an orientation of the repetitive gesture; and a list of gesture cycle records comprising the gesture cycle record and a second gesture cycle record for a second gesture cycle.

5. The method of claim 4, wherein the applying (k) comprises:

(l) applying the action to the presentation of the media content based on a change of a speed or a duration of the finger movement between the first gesture cycle and the second gesture cycle.

6. The method of claim 3, wherein the media player comprises a gesture-content action list comprising a list of associations between media content types, gesture types, and actions, wherein the determining (j) comprises:

(j1) determining a media type of the media content; and (j2) determining the action associated with the gesture type of the repetitive gesture and the media type according to the list of associations.

7. The method of claim 1, wherein the comparing (e1) comprises:

(e1i) comparing the second span with the first span and comparing the second gesture type with the first gesture type; and (e1ii) when a difference between the second span and the first span is within a predetermine threshold, and when the second gesture type matches the first gesture type, determining that the second gesture cycle matches the first gesture cycle.

8. The method of claim 1, further comprising:

(g) storing the first gesture type of the first gesture cycle as a gesture type of the repetitive gesture in the repetitive gesture record.

9. A non-transitory computer readable medium comprising computer readable program code embodied therein, wherein when executed by a processor causes the processor to:

(a) detect a plurality of positions corresponding to a finger movement by a three-dimensional gesture sensor, each of the plurality of positions comprising three-dimensional coordinates for a corresponding position;

(b) determine, by a computing device, whether the plurality of positions contain a gesture cycle, comprising:

(b1) compare the three-dimensional coordinates for a first at least two non-adjacent positions in the plurality of positions; and (b2) upon determining that the three-dimensional coordinates for the first at least two non-adjacent positions match, determine that the plurality of positions contain the first gesture cycle;

(c) upon determining that the plurality of positions contains the first gesture cycle:

(c1) create a first gesture cycle record for the first gesture cycle, comprising:

(c1i) calculate a first span of the three-dimensional coordinates for the first at least two non-adjacent positions;

(c1ii) determine a first gesture type of the first gesture cycle based on the first span; and (c1iii) store the first span and the first gesture type in the one or more attributes of the first gesture cycle in the first gesture cycle record;

(c2) create a repetitive gesture record for a repetitive gesture; and (c3) store the first gesture cycle record in the repetitive gesture record;

(d) determine whether the plurality of positions contain a second gesture cycle, comprising:

(d1) compare the three-dimensional coordinates for a second at least two non-adjacent positions in the plurality of positions;

(d2) upon determining that the three-dimensional coordinates for the second at least two non-adjacent positions in the plurality of positions match, determine that the plurality of positions contain the second gesture cycle; and (d3) creating a second gesture cycle record for the second gesture cycle, comprising:

(d3i) calculate a second span of the three-dimensional coordinates for the second at least two non-adjacent positions;

(d3ii) determine a second gesture type of the second gesture cycle based on the second span; and (d3iii) store the second span and the second gesture type in the one or more attributes of the second gesture cycle in the second gesture cycle record;

(e) determine whether the second gesture cycle matches the first gesture cycle, comprising:

(e1) compare one or more attributes of the first gesture cycle in the first gesture cycle record and one or more attributes of the second gesture cycle in the second gesture cycle record; and (f) upon determining that the second gesture cycle matches the first gesture cycle, store the second gesture cycle record in the repetitive gesture cycle.

10. The medium of claim 9, wherein the processor is further caused to:

(g) send the repetitive gesture record to a media player to apply the repetitive gesture to a presentation of a media content.

11. The medium of claim 10, wherein the processor is further caused to:

(h) receive the repetitive gesture record from the computing device by the media player, the repetitive gesture record comprising a gesture type of the repetitive gesture;

(i) retrieve the gesture type of the repetitive gesture from the repetitive gesture record by the media player;

(j) determine an action associated with the gesture type of the repetitive gesture by the media player; and (k) apply the action to the presentation of the media content.

12. The medium of claim 11, wherein the repetitive gesture record comprises one or more attributes of the repetitive gesture, the one or more attributes of the repetitive gesture comprising the gesture type of the repetitive gesture and one or more of a group comprising: an orientation of the repetitive gesture; and a list of gesture cycle records comprising the gesture cycle record and a second gesture cycle record for a second gesture cycle.

13. The medium of claim 12, wherein the apply (k) comprises:

(k1) apply the action to the presentation of the media content based on a change of a speed or a duration of the finger movement between the first gesture cycle and the second gesture cycle.

14. The medium of claim 11, wherein the media player comprises a gesture-content action list comprising a list of associations between media content types, gesture types, and actions, wherein the determine (j) comprises:

(j1) determine a media type of the media content; and (j2) determine the action associated with the gesture type of the repetitive gesture and the media type according to the list of associations.

15. The medium of claim 9, wherein the compare (e1) comprises:

(e1i) compare the second span with the first span and compare the second gesture type with the first gesture type; and (e1ii) when a difference between the second span and the first span is within a predetermine threshold, and when the second gesture type matches the first gesture type, determine that the second gesture cycle matches the first gesture cycle.

16. The medium of claim 9, wherein the processor is further caused to:

(g) store the first gesture type of the first gesture cycle as a gesture type of the repetitive gesture in the repetitive gesture record.

17. A system, comprising:

a three-dimensional gesture sensor for detecting a plurality of positions corresponding to a finger movement; and a computing device comprising a processor and a non-transitory computer readable medium comprising computer readable program code embodied therein, wherein when executed by the processor causes the computing device to:

(a) detect a plurality of positions corresponding to a finger movement by a three-dimensional gesture sensor, each of the plurality of positions comprising three-dimensional coordinates for a corresponding position;

(b) determine, by a computing device, whether the plurality of positions contain a gesture cycle, comprising:

(b1) compare the three-dimensional coordinates for a first at least two non-adjacent positions in the plurality of positions; and (b2) upon determining that the three-dimensional coordinates for the first at least two non-adjacent positions match, determine that the plurality of positions contain the first gesture cycle;

(c) upon determining that the plurality of positions contains the first gesture cycle:

(c1) create a first gesture cycle record for the first gesture cycle, comprising:

(c1i) calculate a first span of the three-dimensional coordinates for the first at least two non-adjacent positions;

(c1ii) determine a first gesture type of the first gesture cycle based on the first span; and (c1iii) store the first span and the first gesture type in the one or more attributes of the first gesture cycle in the first gesture cycle record;

(c2) create a repetitive gesture record for a repetitive gesture; and (c3) store the first gesture cycle record in the repetitive gesture record;

(d) determine whether the plurality of positions contain a second gesture cycle, comprising:

(d1) compare the three-dimensional coordinates for a second at least two non-adjacent positions in the plurality of positions;

(d2) upon determining that the three-dimensional coordinates for the second at least two non-adjacent positions in the plurality of positions match, determine that the plurality of positions contain the second gesture cycle; and (d3) creating a second gesture cycle record for the second gesture cycle, comprising:

(d3i) calculate a second span of the three-dimensional coordinates for the second at least two non-adjacent positions;

(d3ii) determine a second gesture type of the second gesture cycle based on the second span; and (d3iii) store the second span and the second gesture type in the one or more attributes of the second gesture cycle in the second gesture cycle record;

(e) determine whether the second gesture cycle matches the first gesture cycle, comprising:

(e1) compare one or more attributes of the first gesture cycle in the first gesture cycle record and one or more attributes of the second gesture cycle in the second gesture cycle record; and (f) upon determining that the second gesture cycle matches the first gesture cycle, store the second gesture cycle record in the repetitive gesture cycle.

18. The system of claim 17, wherein the processor is further caused to:

(g) send the repetitive gesture record to a media player to apply the repetitive gesture to a presentation of a media content.

19. The system of claim 18, wherein the processor is further caused to:

(h) receive the repetitive gesture record from the computing device by the media player, the repetitive gesture record comprising a gesture type of the repetitive gesture;

(i) retrieve the gesture type of the repetitive gesture from the repetitive gesture record by the media player;

(j) determine an action associated with the gesture type of the repetitive gesture by the media player; and (k) apply the action to the presentation of the media content.

20. The system of claim 19, wherein the repetitive gesture record comprises one or more attributes of the repetitive gesture, the one or more attributes of the repetitive gesture comprising the gesture type of the repetitive gesture and one or more of a group comprising: an orientation of the repetitive gesture; and a list of gesture cycle records comprising the gesture cycle record and a second gesture cycle record for a second gesture cycle.

21. The system of claim 20, wherein the apply (k) comprises:
 (kh1) apply the action to the presentation of the media content based on a change of a speed or a duration of the finger movement between the first gesture cycle and the second gesture cycle.

22. The system of claim 19, wherein the media player comprises a gesture-content action list comprising a list of associations between media content types, gesture types, and actions, wherein the determine (j) comprises:
 (j1) determine a media type of the media content; and
 (j2) determine the action associated with the gesture type of the repetitive gesture and the media type according to the list of associations.

23. The system of claim 17, wherein the compare (e1) comprises:
 (e1i) compare the second span with the first span and compare the second gesture type with the first gesture type; and
 (e1ii) when a difference between the second span and the first span is within a predetermine threshold, and when the second gesture type matches the first gesture type, determine that the second gesture cycle matches the first gesture cycle.

24. The system of claim 17, wherein the processor is further caused to:
 (g) store the first gesture type of the first gesture cycle as a gesture type of the repetitive gesture in the repetitive gesture record.

* * * * *